(12) United States Patent
Ziaylek et al.

(10) Patent No.: US 8,668,217 B2
(45) Date of Patent: Mar. 11, 2014

(54) AUTOMATED RETRACTABLE STEP APPARATUS UTILIZING OVER-CENTER LOCKING MECHANISM

(75) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 0 days.

(21) Appl. No.: 13/573,050

(22) Filed: Aug. 16, 2012

(65) Prior Publication Data

US 2013/0154230 A1    Jun. 20, 2013

Related U.S. Application Data

(60) Provisional application No. 61/630,592, filed on Dec. 15, 2011.

(51) Int. Cl.
*B60R 3/02* (2006.01)

(52) U.S. Cl.
USPC .......................................... 280/166; 280/163

(58) Field of Classification Search
USPC .......... 280/162, 163, 164.1, 164.2, 166, 169; 187/200, 201, 202; 105/444, 446
See application file for complete search history.

(56) References Cited

U.S. PATENT DOCUMENTS

| | | | |
|---|---|---|---|
| 438,021 A | 10/1890 | Robbins | |
| 2,118,557 A | 5/1938 | Hamilton | |
| 2,146,668 A | 2/1939 | Baade | |
| 2,226,717 A | 12/1940 | Haessler | |
| 2,492,068 A | 12/1949 | Schofield et al | |
| 3,229,993 A | 1/1966 | Riddle | |
| 3,329,443 A | 7/1967 | Lowder et al | |
| 3,408,959 A | 11/1968 | Cripe et al | |
| 3,572,754 A | 3/1971 | Fowler | |
| 3,645,557 A | 2/1972 | Aldropp et al. | |
| 3,751,068 A | 8/1973 | Green | |
| 3,771,815 A | 11/1973 | Bridges | |
| 3,807,758 A | 4/1974 | Rogge | |
| 3,833,240 A | 9/1974 | Weiler | |
| 3,861,713 A | 1/1975 | McKee | |
| 3,887,217 A | 6/1975 | Thomas | |
| 4,017,093 A | 4/1977 | Stecker, Sr. | |
| 4,020,920 A | 5/1977 | Abbott | |
| 4,073,502 A * | 2/1978 | Frank et al. | .................. 280/166 |
| 4,106,790 A | 8/1978 | Weiler | |
| 4,110,673 A | 8/1978 | Magy et al. | |
| 4,180,143 A | 12/1979 | Clugston | |
| 4,185,849 A | 1/1980 | Jaeger | |
| 4,200,303 A | 4/1980 | Kelly | |
| 4,274,648 A | 6/1981 | Robins | |
| 4,312,515 A | 1/1982 | Allori | |
| 4,412,686 A | 11/1983 | Fagrell | |
| 4,440,364 A | 4/1984 | Cone et al. | |

(Continued)

*Primary Examiner* — John Walters
*Assistant Examiner* — Brian Swenson
(74) *Attorney, Agent, or Firm* — Sperry, Zoda & Kane

(57) ABSTRACT

An automatically deployable step apparatus particularly usable with vehicle such as a fire truck having a passenger compartment at substantial distance from the surrounding environmental surface which provides powered movement between a deployed position and a retracted position and can be mounted in a relatively small restricted area in order to avoid interference with a truck cab which tilted to provide engine access, said apparatus utilizing a unique over-center locking mechanism to provide secure locking of the step in the deployed position while maintaining an apparatus having limited overall dimensions. A unique linkage system is provided for facilitating accurately powered automated movement.

18 Claims, 11 Drawing Sheets

(56) References Cited

U.S. PATENT DOCUMENTS

| | | | |
|---|---|---|---|
| 4,623,160 | A | 11/1986 | Trudell |
| 4,679,810 | A | 7/1987 | Kimball |
| 4,708,355 | A | 11/1987 | Tiede |
| 4,930,797 | A | 6/1990 | Parrill |
| 4,982,974 | A | 1/1991 | Guidry |
| 5,085,450 | A | 2/1992 | DeHart, Sr. |
| 5,228,707 | A | 7/1993 | Yoder |
| 5,342,073 | A | 8/1994 | Poole |
| 5,498,012 | A | 3/1996 | McDaniel et al. |
| 5,538,269 | A | 7/1996 | McDaniel et al. |
| 5,547,040 | A | 8/1996 | Hanser et al. |
| 5,842,709 | A | 12/1998 | Maccabee |
| 5,957,237 | A | 9/1999 | Tigner |
| 6,135,472 | A | 10/2000 | Wilson et al. |
| 6,213,486 | B1 | 4/2001 | Kunz et al. |
| 6,641,158 | B2 | 11/2003 | Leitner |
| 6,655,706 | B1 | 12/2003 | Murrell |
| 6,685,204 | B1 | 2/2004 | Hehr |
| 6,830,257 | B2 | 12/2004 | Leitner |
| 6,834,875 | B2 | 12/2004 | Leitner et al. |
| 6,938,909 | B2 | 9/2005 | Leitner |
| 6,942,233 | B2 | 9/2005 | Leitner et al. |
| 6,955,370 | B2 * | 10/2005 | Fabiano et al. ............. 280/163 |
| 7,007,961 | B2 | 3/2006 | Leitner et al. |
| 7,055,839 | B2 | 6/2006 | Leitner |
| 7,163,221 | B2 | 1/2007 | Leitner |
| 7,168,722 | B1 | 1/2007 | Piotrowski et al. |
| 7,219,911 | B2 | 5/2007 | Sukonthapanich et al. |
| 7,367,574 | B2 | 5/2008 | Leitner |
| 7,380,807 | B2 | 6/2008 | Leitner |
| 7,398,985 | B2 | 7/2008 | Leitner et al. |
| 7,413,204 | B2 | 8/2008 | Leitner |
| 7,469,916 | B2 | 12/2008 | Watson |
| 7,503,572 | B2 | 3/2009 | Park et al. |
| 7,566,064 | B2 | 7/2009 | Leitner et al. |
| 7,584,975 | B2 | 9/2009 | Leitner |
| 7,594,672 | B2 * | 9/2009 | Piotrowski ............. 280/166 |
| 7,677,584 | B2 | 3/2010 | Raley et al. |
| 7,823,896 | B2 | 11/2010 | VanBelle et al. |
| 7,841,609 | B2 | 11/2010 | Okada et al. |
| 7,934,737 | B2 | 5/2011 | Okada et al. |
| 7,967,311 | B2 | 6/2011 | Phillips |
| 8,469,380 | B2 * | 6/2013 | Yang et al. ............. 280/166 |

* cited by examiner

AUTOMATED RETRACTABLE STEP APPARATUS UTILIZING OVER-CENTER LOCKING MECHANISM

The present utility application hereby formally claims priority of currently pending U.S. Provisional Patent application No. 61/630,592 filed Dec. 15, 2011 on "AUTOMATIC RETRACTABLE STEP APPARATUS UTILIZING OVER-CENTER LOCKING MECHANISM" filed by the same inventor listed herein, namely, Michael P Ziaylek and W Brian McGinty, and assigned to the same assignee, namely, Michael P Ziaylek. Said referenced provisional application is hereby formally incorporated by reference as an integral part of the present application.

BACKGROUND OF THE INVENTION

1. Field of the Invention

The present invention deals with the field of automated powered deployable and retractable steps for facilitating entry and exit from the passenger compartment of motor vehicles and particularly for use with emergency vehicles such as fire trucks. This apparatus can be coordinated to open simultaneously with opening of one of the vehicle doors and to retract simultaneously with closing of the adjacent door. Such vehicles can have extremely limited space within which such automated step apparatus can be mounted due to the nature of such fire truck cab design. Many fire trucks have tilting cabs that tilt forwardly for the purpose of providing access to the vehicle engine for maintenance. This construction greatly limits the amount of space available for mounting and positioned of the step apparatus since it must not interfere with the cab tilting construction motion. The available area can be as small as 21" horizontally and/or 9" vertically. The present invention provides a construction which is small enough to fit within this restricted environment and yet still is constructed having a very strong and rigidly secured deployable step when in the deployed position. Such steps are subjected to significant impact and other forces when used for the purposes of facilitating entry into the passenger compartment of a truck by firemen whose bodies can be heavily encumbered with a significant amount of emergency equipment. As such, the strength of and rigidity of the deployable step apparatus needs to be very secure and it is somewhat problematical to devise such a rigid step when restricted by the limited dimension within which the overall apparatus must be capable of being positioned. As such, the present invention utilizes a uniquely configured over-center locking mechanism to achieve a firmly secure, rigid, automatically deployable auxiliary step for an emergency vehicle which is capable of being retracted and deployed within very limited vertical and horizontal dimensions.

2. Description of the Prior Art

Many patents have been granted on various types of automated retractable steps many of which are usable with vehicles such as shown in U.S. Pat. No. 438,021 patented Oct. 7, 1890 to E. P. Robbins on a "Movable Vehicle-Step"; and U.S. Pat. No. 2,118,557 patented May 24, 1938 to G. W. Hamilton and assigned one-fourth to Vinton H. Rowlett on a "Retractable Step For Vehicles"; and U.S. Pat. No. 2,146,668 patented Feb. 7, 1939 to B. C. Baade and assigned to Goodyear-Zeppelin Corporation on a "Retractable Car Step"; and U.S. Pat. No. 2,226,717 patented Dec. 31, 1940 to W. M. Haessler and assigned to American Car and Foundry Company on a "Combined Folding Step. Platform, And Skirt Arrangement"; and U.S. Pat. No. 2,492,068 patented Dec. 20, 1949 to E. L. Schofield et al and assigned to Superior Coach Corporation on a "Retractable Vehicle Step"; and U.S. Pat. No. 3,229,993 patented Jan. 18, 1966 to M. M. Riddle on a "Door Operated Vehicle Boarding Step"; and U.S. Pat. No. 3,329,443 patented Jul. 4, 1967 to E. Lowder et al on a "Swing-Out Step For Vehicle"; and U.S. Pat. No. 3,408,959 patented to A. R. Cripe et al on Nov. 5, 1968 and assigned to United Aircraft Corporation on a "Folding Staircase"; and U.S. Pat. No. 3,572,754 patented Mar. 30, 1971 to S. Fowler and assigned to General Motors Corporation on a "Vehicle Step Arrangement"; and U.S. Pat. No. 3,645,557 patented Feb. 29, 1972 to A. Aldropp et al on a "Foldable Retractable Step Assembly For Campers And Like Vehicles"; and U.S. Pat. No. 3,751,068 patented Aug. 7, 1973 to H. C. R. Green on a "Door-Operated Vehicle Boarding Step"; and U.S. Pat. No. 3,771,815 patented Nov. 13, 1973 to R. F. Bridges on an "Extensible Step"; and U.S. Pat. No. 3,807,758 patented Apr. 30, 1974 to G. E. Rogge on a "Retractable Step For A Motor Home"; and U.S. Pat. No. 3,833,240 patented Sep. 3, 1974 to R. C. Weiler on a "Retractable Step For Use With Trailers, Motor Homes, Or Other Vehicles"; and U.S. Pat. No. 3,861,713 patented Jan. 21, 1975 to D. P. McKee on a "Retractile Door Step For Motor Homes"; and U.S. Pat. No. 3,887,217 patented Jun. 3, 1975 to W. W. Thomas on a "Retractable Step For Vehicles"; and U.S. Pat. No. 4,017,093 patented Apr. 12, 1977 to A. Stecker, Sr. on a "Vehicle Step"; and U.S. Pat. No. 4,020,920 patented May 3, 1977 to J. D. Abbott on a "Retractable Transit Coach Step"; and U.S. Pat. No. 4,073,502 patented Feb. 14, 1978 to R. C. Frank et al on a "Retractable Step"; and U.S. Pat. No. 4,106,790 patented Aug. 15, 1978 to R. C. Weiler and assigned to Blackstone Manufacturing Co., Inc. on a "Vehicle Step"; and U.S. Pat. No. 4,110,673 patented Aug. 29, 1978 to E. J. Nagy et al and assigned to Kwikee Enterprises, Inc. on an "Extendable Vehicle Step And Step Motor Control System"; and U.S. Pat. No. 4,180,143 patented Dec. 25, 1979 to G. D. Clugston on a "Step For Vehicles"; and U.S. Pat. No. 4,185,849 patented Jan. 29, 1980 to W. J. Jaeger on a "Retractable Step For Motor Vehicle"; and U.S. Pat. No. 4,200,303 patented Apr. 29, 1980 to P. N. Kelly on a "Door-Operated Boarding Step For Trucks"; and U.S. Pat. No. 4,274,648 patented Jun. 23, 1981 to R. R. Robins on a "Vehicle Bumper Step"; and U.S. Pat. No. 4,312,515 patented Jan. 26, 1982 to R. J. Allori and assigned to International Harvester Company on a "Self-Locking Step Assembly For A Vehicle"; and U.S. Pat. No. 4,412,686 patented Nov. 1, 1983 to E. T. Fagrell and assigned to AB Volvo on a "Folding Step For Vehicles"; and U.S. Pat. No. 4,440,364 patented Apr. 3, 1984 to S. S. Cone et al on a "Retractable Aircraft Step"; and U.S. Pat. No. 4,623,160 patented Nov. 18, 1986 to J. W. Trudell on an "Extensible Step Assembly For Vehicles"; and U.S. Pat. No. 4,679,810 patented Jul. 14, 1987 to J. F. Kimball on a "Powered Step Assembly For Vehicles"; and U.S. Pat. No. 4,708,355 patented Nov. 24, 1987 to J. Tiede on a "Hideaway Vehicle Step"; and U.S. Pat. No. 4,930,797 patented Jun. 5, 1990 to L. R. Parrill on a "Safety Step System"; and U.S. Pat. No. 4,982,974 patented Jan. 8, 1991 to W. L. Guidry and assigned to Interco Tire Corporation on an "Adjustable High Vehicle Boarding Step"; and U.S. Pat. No. 5,085,450 patented Feb. 4, 1992 to L. DeHart, Sr. and assigned to The Dometic Corporation on a "Step Stall Prevention For Vehicle Steps"; and U.S. Pat. No. 5,228,707 patented Jul. 20, 1993 to C. T. Yoder and assigned to Carriage, Inc. on a "Retractable Vehicle Step"; and U.S. Pat. No. 5,342,073 patented Aug. 30, 1994 to R. L. Poole on a "Retractable Step For Motor Vehicles"; and U.S. Pat. No. 5,498,012 patented Mar. 12, 1996 to P. K. McDaniel et al and assigned to McDaniel Manufacturing Inc. on a "Convertible Vehicle Step"; and U.S. Pat. No. 5,538,269 patented Jul. 23, 1996 to P. K. McDaniel et al and assigned to McDaniel Manufacturing, Inc. on a "Convertible Vehicle Step"; and U.S. Pat. No. 5,547,040 patented Aug. 20, 1996 to P. E. Hanser et al and assigned to HWH Corporation on an "Automatic Step For Recreational Vehicles"; and U.S. Pat. No. 5,842,709 patented Dec. 1, 1998 to M. M. Maccabee and assigned to Kwikee Products Co., Inc. on a "Retractable, Swing Down Step Assembly"; and U.S. Pat. No. 5,957,237 patented Sep. 28, 1999 to R. H. Tigner and assigned to Specific Cruise Systems, Inc. on a "Motorized Collapsible Step"; and U.S. Pat. No. 6,135,472 patented Oct. 24, 2000 to K. Wilson et al and assigned to SportRack LLC on a "Motor Powered Running Board"; and U.S. Pat. No. 6,213,486 patented Apr. 10, 2001 to J. R. Kunz et al and assigned to Kwikee Products Co., Inc. on a "Step Assembly With Concealed Lower Tread"; and U.S. Pat. No. 6,641,158 patented Nov. 4, 2003 to H. Leitner and assigned to American Moto Products, Inc. on a "Retractable Vehicle Step"; and U.S. Pat. No. 6,655,706 patented Dec. 2, 2003 to J. Murrell and assigned to Hickory Springs Manufacturing Company on an "Extensible-Retractable RV Step And Method Of Assembling Same"; and U.S. Pat. No. 6,685,204 patented Feb. 3, 2004 to K. I. Hehr on a "Hitch-Mounted Extensible Step For Pickup Trucks And Other Vehicles Having Tailgates"; and U.S. Pat. No. 6,830,257 patented Dec. 14, 2004 to H. Leitner and assigned to American Moto Products, Inc. on a "Retractable Vehicle Step"; and U.S. Pat. No. 6,834,875 patented Dec. 28, 2004 to H. Leitner et al and assigned to American Moto Products, Inc. on a "Retractable Vehicle Step"; and U.S. Pat. No. 6,938,909 patented Sep. 6, 2005 to H. Leitner and assigned to 89908, Inc. on a "Retractable Vehicle Step"; and U.S. Pat. No. 6,942,233 patented Sep. 13, 2005 to H. Leitner et al and assigned to 89908, Inc. on a "Retractable Vehicle Step"; and U.S. Pat. No. 7,007,961 patented Mar. 7, 2006 to H. Leitner et al and assigned to 89908, Inc. on a "Retractable Vehicle Step"; and U.S. Pat. No. 7,055,839 patented Jun. 6, 2006 to H. Leitner and assigned to 89908, Inc. on a "Retractable Vehicle Step"; and U.S. Pat. No. 7,163,221 patented Jan. 16, 2007 to H. Leitner and assigned to 89908, Inc. on a "Retractable Vehicle Step With Anti-Strike/Anti-Pinch Sensor System"; and U.S. Pat. No. 7,168,722 patented Jan. 30, 2007 to L. D. Piotrowski et al on a "Pull-Out Step Assembly For A Pickup Truck"; and U.S. Pat. No. 7,219,911 patented May 22, 2007 to D. Sukonthapanich et al and assigned to Ventra Group Inc. on a "Retractable Vehicle Step Assembly"; and U.S. Pat. No. 7,367,574 patented May 6, 2008 to H. Leitner on "Drive Systems For Retractable Vehicle Step"; and U.S. Pat. No. 7,380,807 patented Jun. 3, 2008 to H. Leitner and assigned to 89908, Inc. on a "Retractable Vehicle Step"; and U.S. Pat. No. 7,398,985 patented Jul. 15, 2008 to H. Leitner et al and assigned to 89908, Inc. on a "Retractable Vehicle Step"; and U.S. Pat. No. 7,413,204 patented Aug. 19, 2008 to H. Leitner and assigned to 89908, Inc. on a "Retractable Vehicle Step"; and U.S. Pat. No. 7,469,916 patented Dec. 30, 2008 to B. E. Watson and assigned to Magma International Inc. on an "Automated Deployable Running Board"; and U.S. Pat. No. 7,503,572 patented Mar. 17, 2009 to B. K. Park et al on a "Retractable Vehicle Step"; and U.S. Pat. No. 7,566,064 patented Jul. 28, 2009 to H. Leitner et al and assigned to 88908, Inc. on a "Retractable Vehicle Step"; and U.S. Pat. No. 7,584,975 patented Sep. 8, 2009 to H. Leitner and assigned to 89908, Inc. on a "Retractable Vehicle Step"; and U.S. Pat. No. 7,677,584 patented Mar. 16, 2010 to R. W. Raley et al and assigned to Actuant Corporation on a "Motorized Collapsible Step"; and U.S. Pat. No. 7,823,896 patented Nov. 2, 2010 to M. VanBelle et al and assigned to Ford Global Technologies and Multimatic, Inc. on an "Articulated Step System For Automotive Vehicle"; and U.S. Pat. No. 7,841,609 patented Nov. 30, 2010 to H. Okada et al and assigned to Aisin Seiki Kabushiki Kaisha on a "Step Device For Vehicle"; and U.S. Pat. No. 7,934,737 patented May 3, 2011 to H. Okada et al and assigned to Aisin Seiki Kabushiki Kaisha on a "Step Device For Vehicle"; and U.S. Pat. No. 7,967,311 patented Jun. 28, 2011 to D. E. Phillips on a "Multi Position Step".

OBJECTS OF THE INVENTION

It is an object of the present invention to provide an automated retractable step apparatus which utilizes an over-center locking mechanism which can be mounted in restricted dimensional areas adjacent any vehicle passenger compartment door.

It is an object of the present invention to provide an automated retractable step apparatus which can be usable with emergency vehicles, especially in constructions having cabs that tilt to provide engine access It is an object of the present invention to provide an automated retractable step apparatus which allows the step to deploy approximately six inches below storage position in order to facilitate entry and exit from the vehicle passenger compartment.

It is an object of the present invention to provide an automated retractable step apparatus which can be conveniently powered by a 12 Volt electric actuator.

It is an object of the present invention to provide an automated retractable step apparatus which can be wired to a door interlock assembly to automatically move to the deployed position responsive to the opening of an adjacent door and to retract responsive to the door closing.

It is an object of the present invention to provide an automated retractable step apparatus which requires minimal maintenance costs and which may be retrofitted onto existing apparatus and which can sustain static loads of up to 500 pounds.

It is an object of the present invention to provide an automated retractable step apparatus which powers movement of a 20" by 5" stepping surface between an upper retracted position and a lower deployed position.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
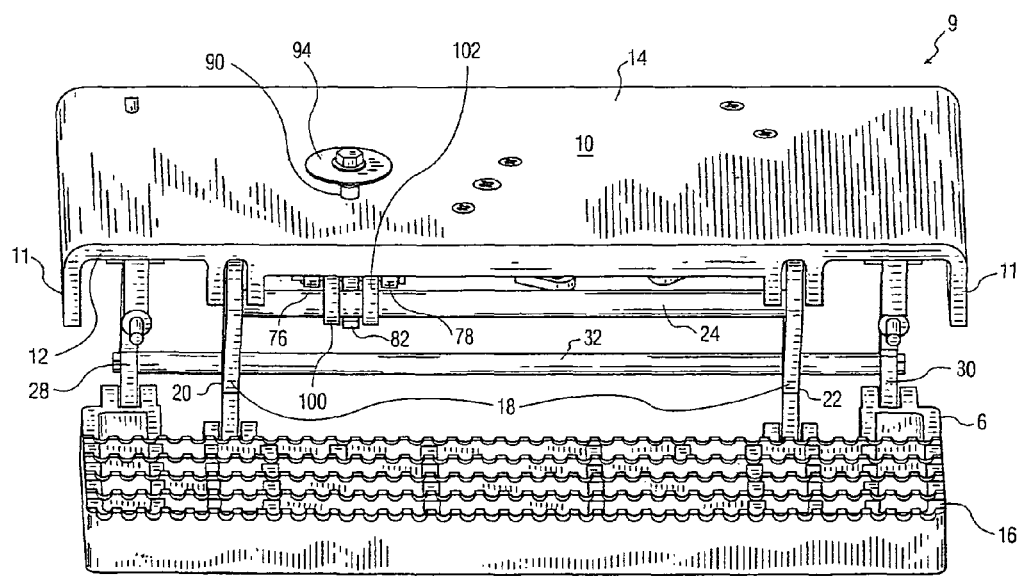
FIG. 1 is an upper front perspective illustration of an embodiment of the automated retractable step apparatus of the present invention shown in the deployed position.
Figure 2:
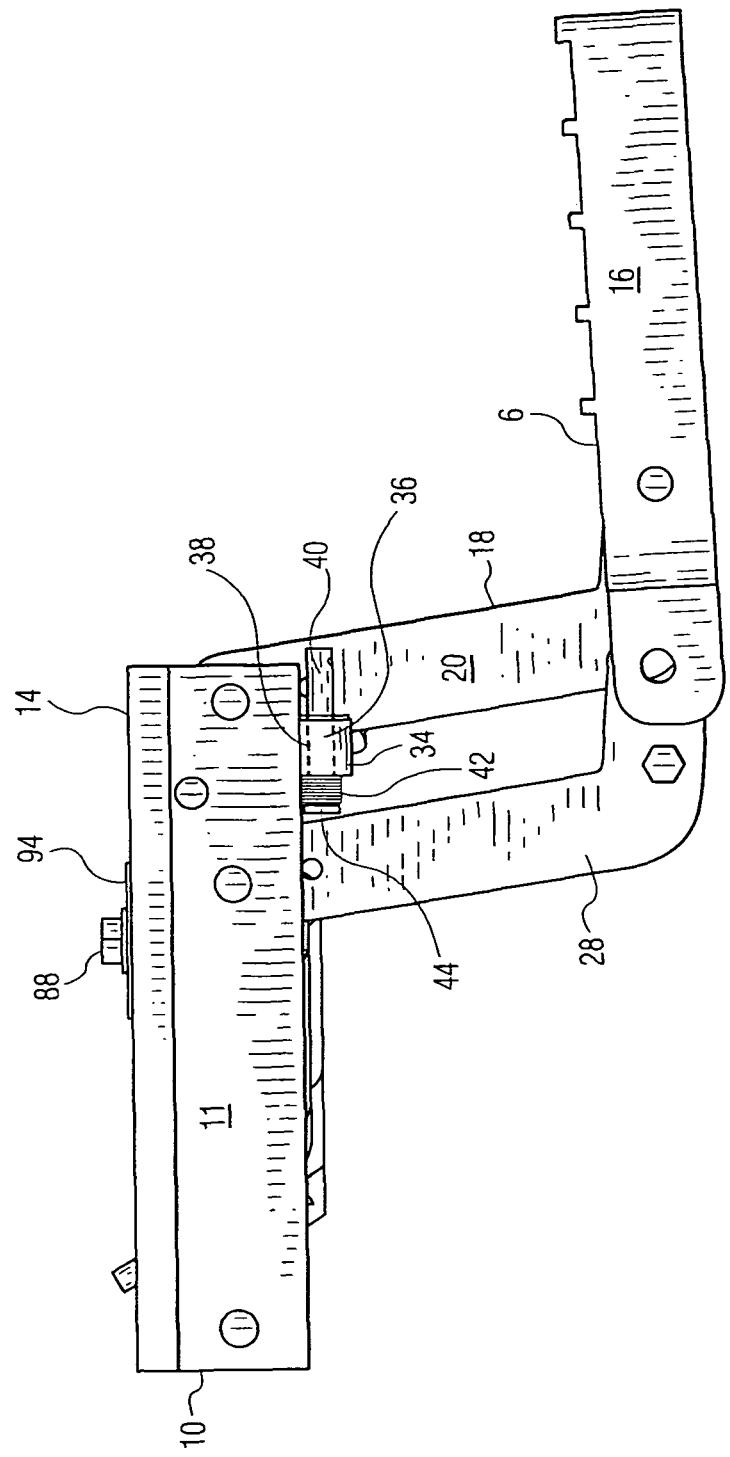
FIG. 2 is a left side plan view of the embodiment shown in FIG. 1 shown in the deployed position.
Figure 3:
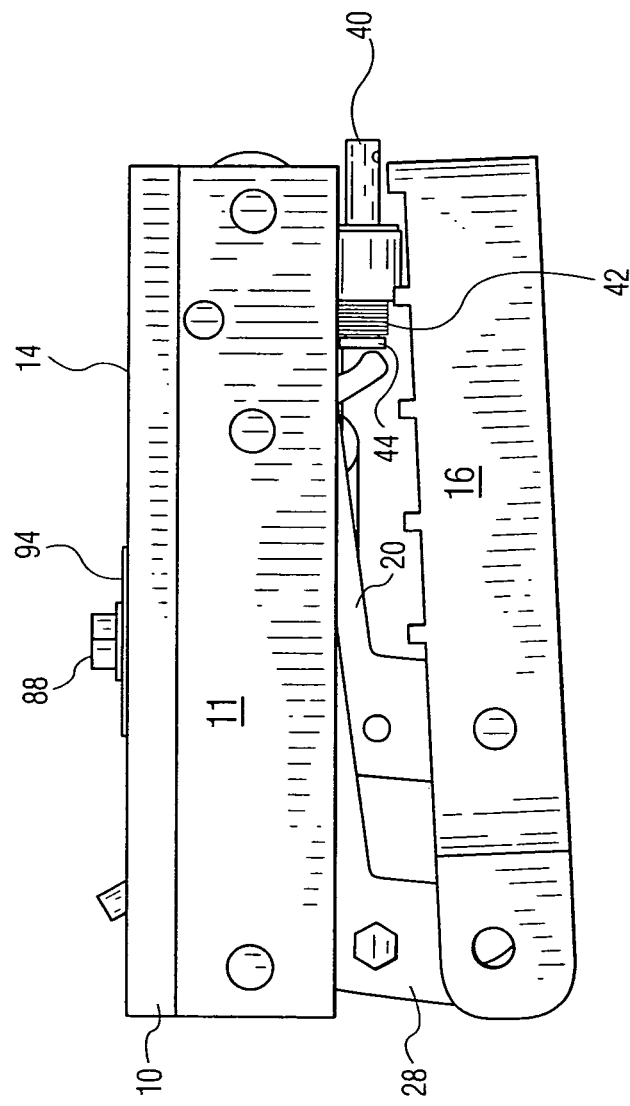
FIG. 3 is a left side plan view of the embodiment shown in FIG. 2 shown in the retracted position.
Figure 4:
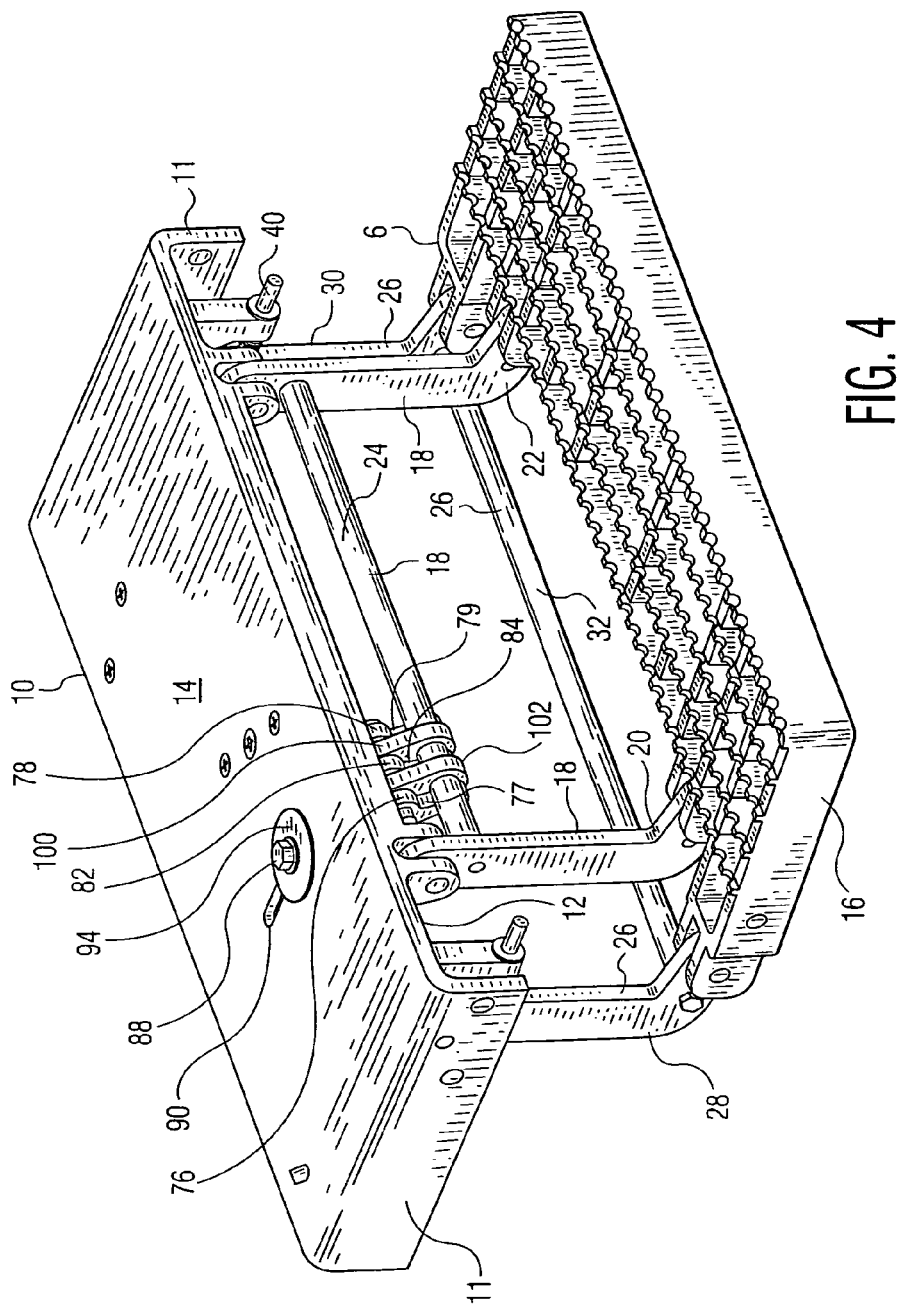
FIG. 4 is a three-quarter perspective view of the embodiment shown in FIG. 1 viewed from the left in the deployed position.
Figure 5:
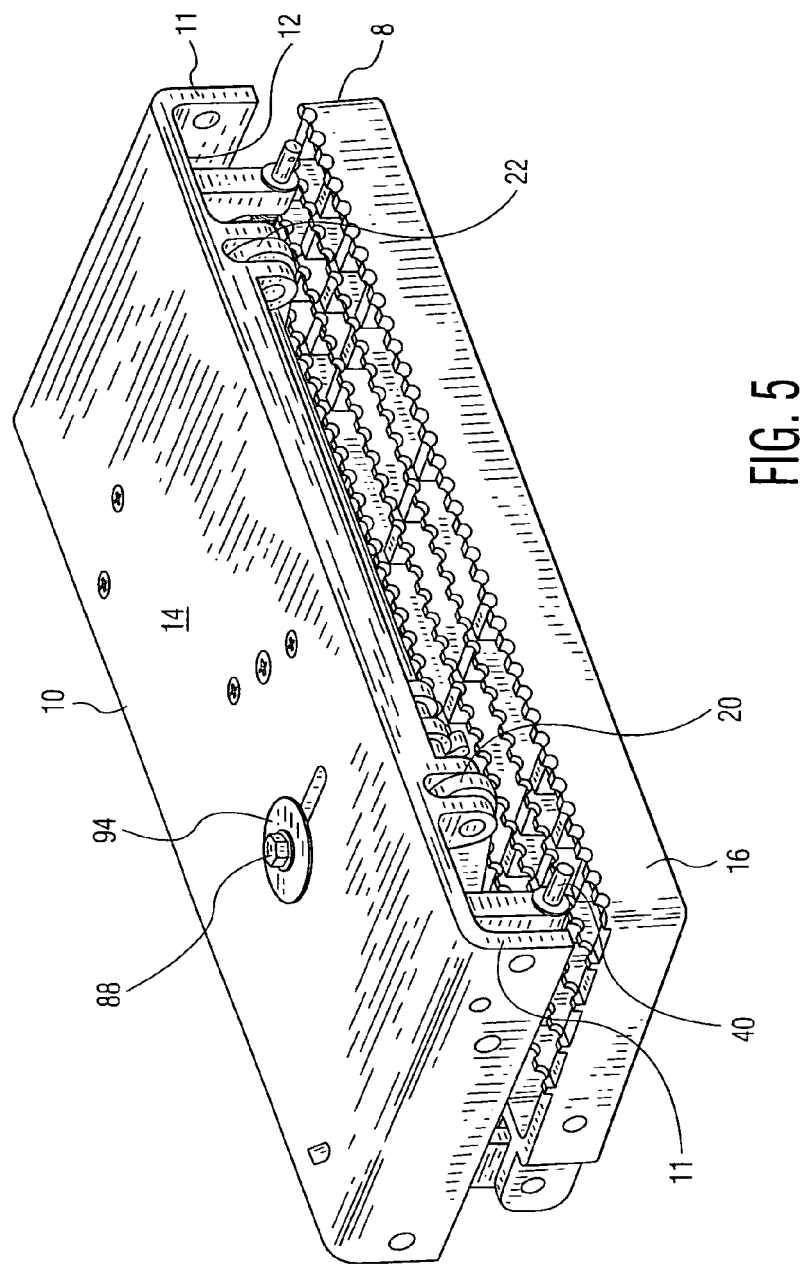
FIG. 5 is an illustration of the embodiment shown in FIG. 4 in the retracted position.
Figure 6:
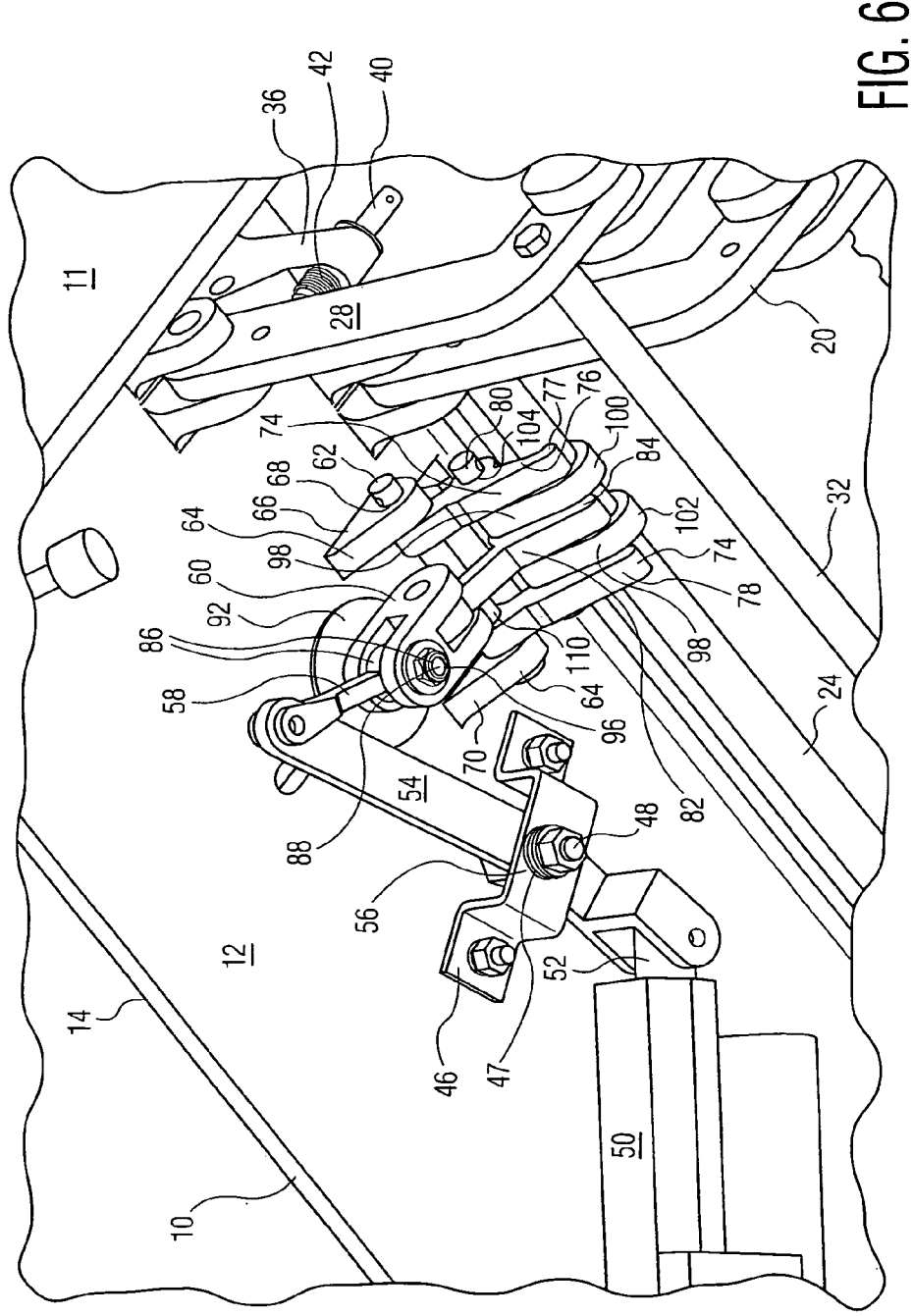
FIG. 6 is a exploded bottom perspective view of the embodiment shown in FIG. 1 illustrating the details of the powering and locking linkage positioned below the main housing plate of the apparatus of the present invention shown in the deployed position.
Figure 7:
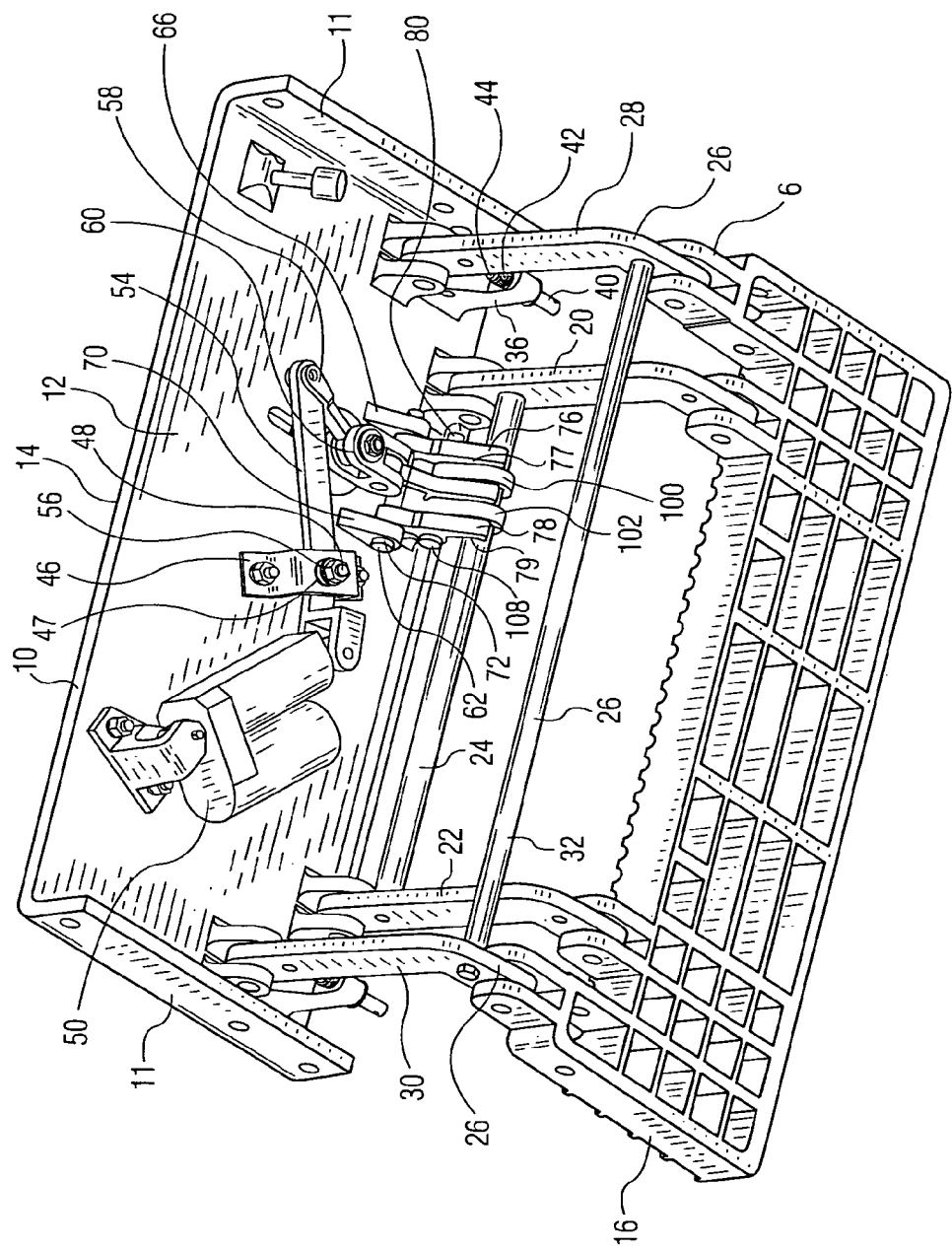
FIG. 7 is a three-quarter perspective view of the embodiment of the apparatus shown in FIG. 1 of the present invention shown from the left and from beneath fully deployed.
Figure 8:
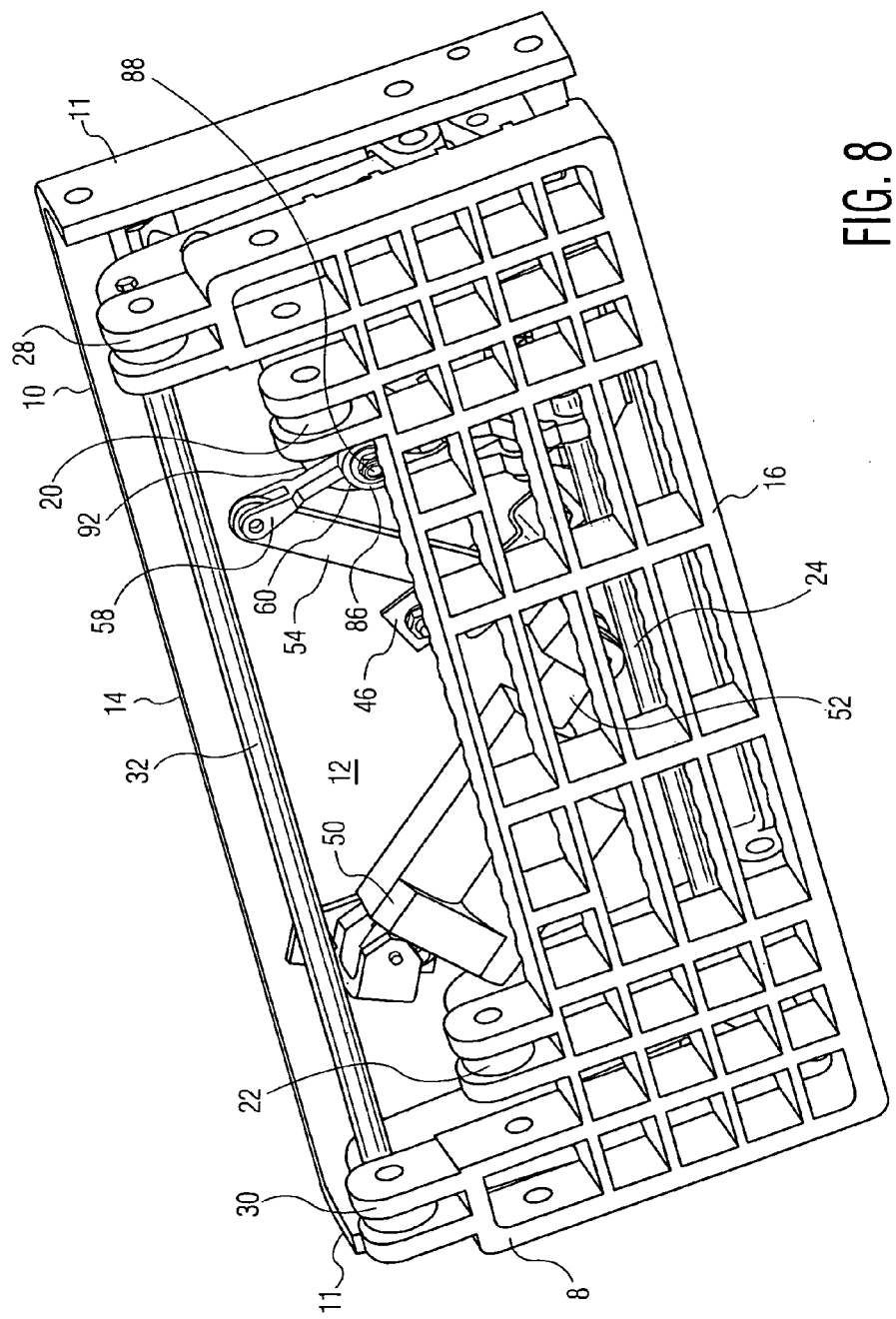
FIG. 8 is a bottom perspective view of an embodiment of the apparatus of the present invention in the retracted position.
Figure 9:
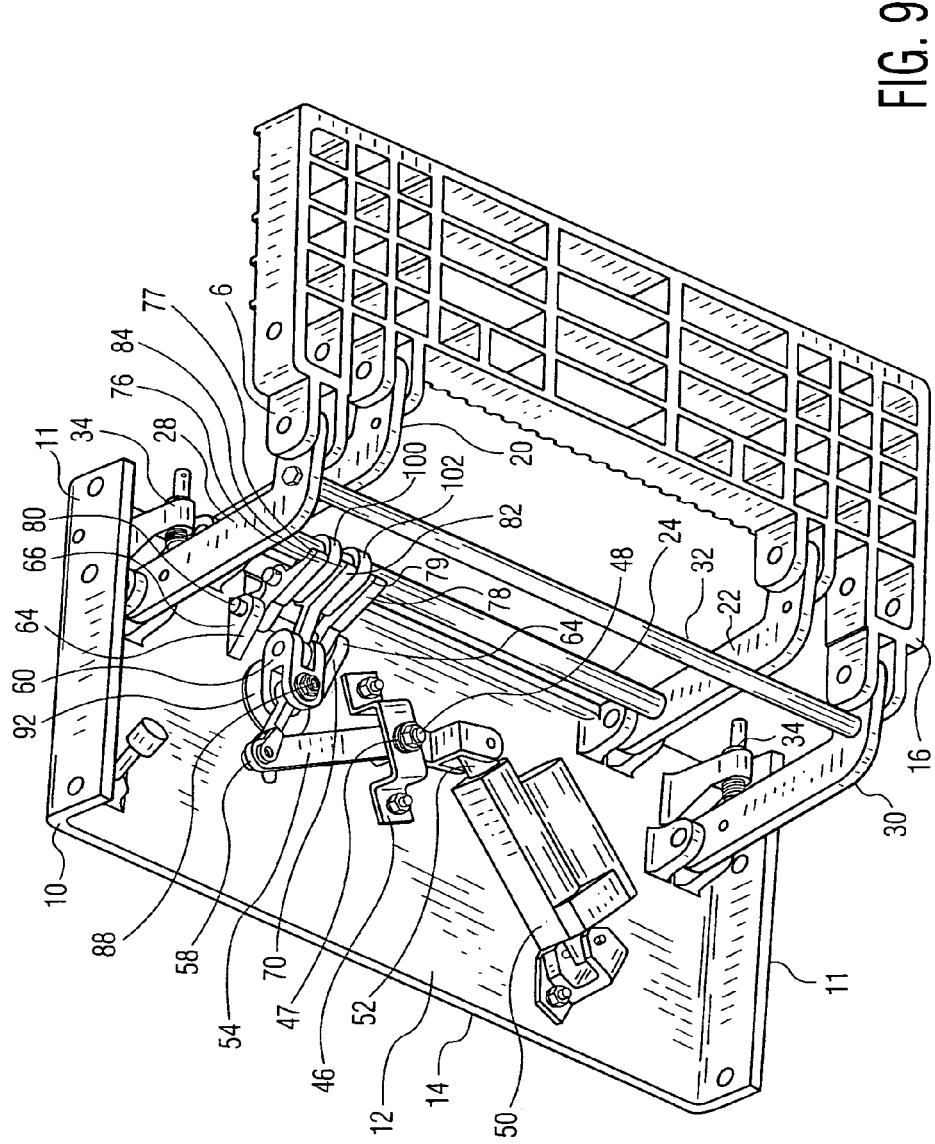
FIG. 9 is three-quarter perspective view of the embodiment of the apparatus shown in FIG. 1 of the present invention shown from the right from beneath fully deployed.
Figure 10:
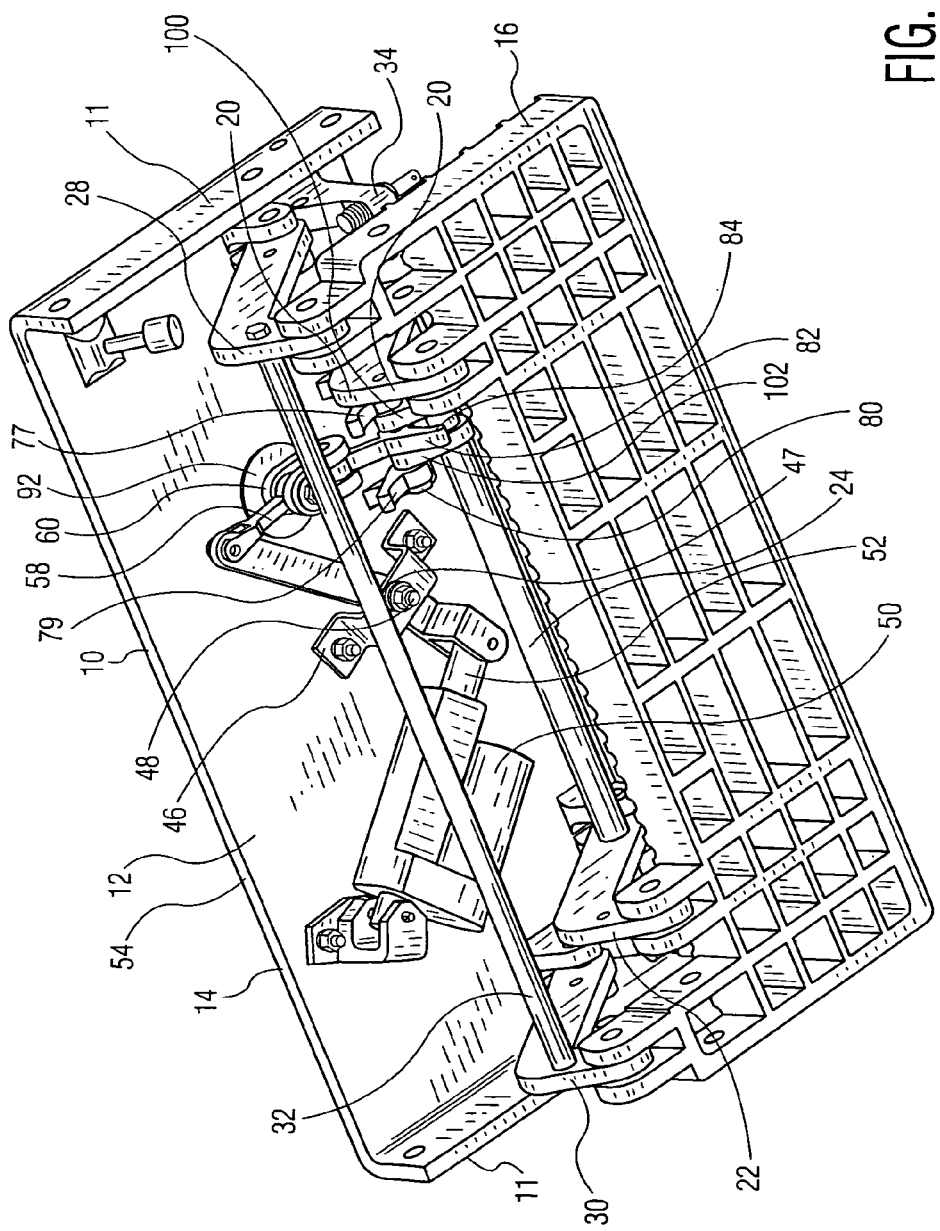
FIG. 10 is an illustration of an embodiment of the present invention shown from the right and beneath shown at an intermediate position between the retracted position and the deployed position.
Figure 11:
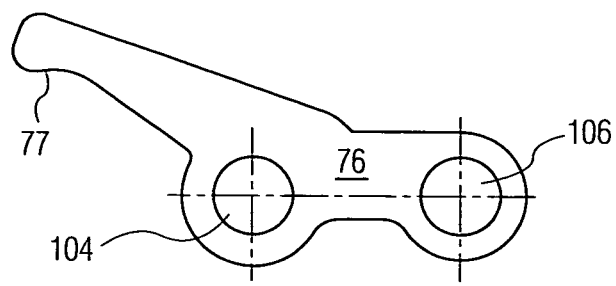
FIG. 11 is a side plan view of an embodiment of the first outer locking lever of the present invention.
Figure 12:
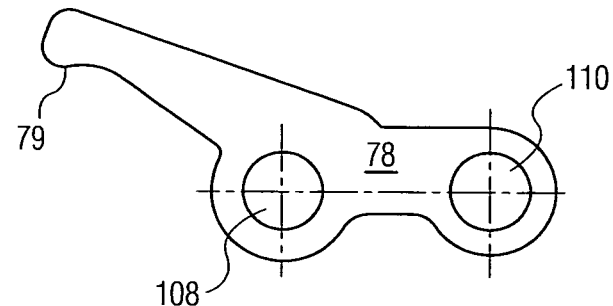
FIG. 12 is a side plan view of an embodiment of the second outer locking lever of the present invention.
Figure 13:
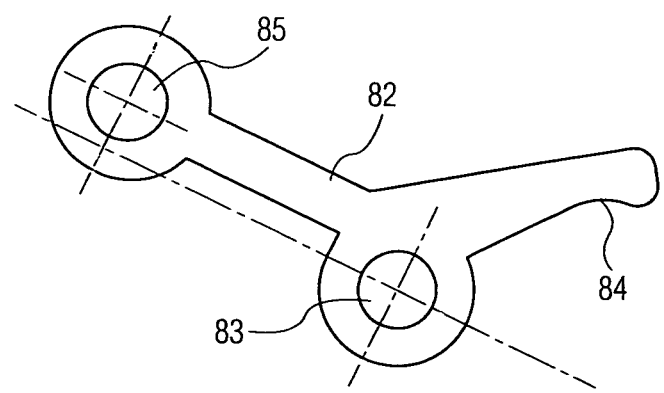
FIG. 13 is a side plan view of an embodiment of the inner locking lever of the present invention.

The present invention discloses an automatic retractable step apparatus usable with a vehicle which is movable between a deployed position 6 as shown best in FIGS. 1, 2, 4, 6, 7 and 9 and also is movable to a retracted position 8 as shown best in FIGS. 3, 5 and 8. FIG. 10 shows the apparatus at an intermediate position between fully deployed and fully retracted. The overall size of the construction of the apparatus will be preferably less than 21" in width and, preferably less than 9" in vertical height such that it does not inhibit in any way the operation of the vehicle such as the tilting mechanism for providing engine access for a conventional emergency vehicle such as a fire truck or the like. The construction of the retractable step apparatus includes a main housing bracket 9 which includes a main housing plate 10 which generally extends horizontally and will preferably include side mounting sections 11 which can include a plurality of holes to facilitate mounting with respect to the truck construction. The side mounting sections 11 will often be formed as ears or perpendicular sections extending away from the main section of the housing plate 10 at an angle thereto.

The construction of the main housing plate includes an upper surface 14 preferably mountable in abutment with respect to the truck construction and a lower surface 12 oppositely positioned relative to the upper surface and facing downwardly therefrom to which the operating mechanism of the automatically retractable construction can be attached.

A step plate 16 is included which is movable between a retracted position 8 immediately adjacent to and below the lower surface 12 of the main housing plate 10 and a deployed position 6 extending downwardly and forwardly relative to the lower surface 12 of the main housing plate 10 to facilitate entry and exit from the vehicle passenger compartment. A driven arm assembly 18 controls and powers the swinging movement of the step plate 16 between the deployed position 6 and the retracted position 8.

The construction of the driven arm assembly 18 will preferably include a first driven arm member 20 pivotally secured to the lower surface 12 of the main housing plate 10 generally positioned extending downwardly from the main housing plate 10 and a second driven arm member 22 which is also pivotally mounted with respect to both the step plate 16 and the lower surface 12 of the main housing plate 10 and also is positioned extending downwardly therefrom at a location spatially disposed from said first driven arm member 20. To control coordinating movement between the first driven arm member 20 and the second driven arm member 22 a driven arm cross member 24 which is shown in the Figures herein as being in the shape of a rod will be fixedly secured to the first driven arm member 20 and second driven arm member 22 to assure simultaneous movement of the driven arm members 20 and 22 together. The driven arm assembly 18 is also attached to a drive mechanism for facilitating powering of movement of the step plate 16 between the deployed position 6 and the retracted position 8, respectively.

Another arm assembly will be included for controlling and guide movement of the step between the deployed and retracted positions which is not powered. This free arm assembly 26 which will include a first free arm member 28 pivotally secured with respect to the step plate 16 and the lower surface 12 of the main housing plate 10. Similarly the free arm assembly 26 will include a second free arm member 30 which is pivotally secured with respect to the step plate 16 and the lower surface 12 of the main housing plate 10 at a position spatially disposed from said first free arm member 26. A free arm cross member 32 will be fixedly secured to the first free arm member 28 and the second free arm member 30 preferably at opposite ends thereof to assure simultaneous coordinated movement of these two free arm members whenever the step plate 16 is driven between the deployed position 6 and the retracted position 8. The free arm assembly 26 does not power movement of the step plate 16 but does serve to guide, strengthen and control the positioning of the step plate 16 particularly when located in the deployed position 6. Powering of movement of the step plate 16 between the deployed position 6 and the retracted position 8 is provided solely by driving of the driven arm assembly 18.

At least one stop assembly 34 is preferably included in the apparatus of the present invention to limit the movement of the free arm assembly 26 toward the deployed position 6 thereof. This stop assembly is mounted with respect to the lower surface 12 of the main housing plate 10. Preferably a housing stop boss 36 extends downwardly from the lower surface 12 and defines a housing stop hole 38 extending therethrough extending generally parallel to the lower surface 12. A stop pin member 40 extends through the housing stop hole 38. A resilient biasing means 42 such as a stop spring means preferably in the form of a coil spring extends around the stop pin 40 and a stop collar 44 in the form a washer will be positioned extending around the stop pin 40 with the stop spring means 42 positioned between the stop collar 44 and the portion of the housing stop boss 36 which surrounds the housing stop hole 38. In this manner as one of the free arm members of the free arm assembly 26 moves the step plate 16 toward the deployed position 6 the free arm will come into abutment with the stop assembly which define the location of the fully deployed position and will limit any undesirable excessive movement beyond the deployed position. In the configuration shown in this embodiment of the stop assembly the stop pin member 40 is freely movable axially through the housing stop hole 38. As such, as one of the free arm members 28 or 30 of the free arm assembly 26 come into abutment with the stop pin member 40 it will move axially within the housing stop hole 38 thereby compressing the stop spring means 42. This movement will ease the final portion of movement of the free arm assembly 26 toward the deployed position 6 and cushion the stopping thereof so that it will not be abrupt. Once the stop spring means 42 is completely compressed the free arm assembly 26 will have stopped movement of the step plate 16 in the desired final location for the deployed position 6. This position can be adjusted by adjustment of positioning of components of the stop assembly.

The apparatus of the prevent invention includes a housing pivot bracket 46 which is generally U-shaped and is secured to the lower surface 12 of the main housing plate 10. The housing pivot bracket 46 will preferably define a housing bracket aperture 47 extending therewithin preferably in a direction oriented perpendicularly with respect to the lower surface 12 and therebelow. Housing bracket pin 48 is designed to extend through the housing bracket aperture. The housing bracket pin 48 can be threaded and be in the form of a bolt with a nut to facilitate pivotally movable securement relative to the housing bracket aperture 47.

The linkage for driving of the step plate between the deployed position 6 and the retracted position 8 includes an output arm 54 mounted extending generally parallel to the lower surface 12 of the main housing plate 10. This output arm 54 will preferably define an output arm aperture 56 therewithin. Preferably output arm aperture 56 and housing bracket aperture 47 are vertically registered with respect to one another such that the housing bracket pin or stud 48 can extend through both the housing bracket aperture 47 and the output arm aperture 56 simultaneously for facilitating securement with pivotal relative movement between the output arm 54 and the main housing plate 10.

The apparatus for driving movement of the step plate 16 for the present invention includes a longitudinal drive means 50 preferably pivotally secured with respect to the lower surface 12 of the main housing plate 10 and including a drive output rod 52 which is movable to extend outwardly or be retracted inwardly therewithin Longitudinal drive means preferably comprises an electrically powered mechanism. In the apparatus of the present invention longitudinal extension of the longitudinal drive means 50 will cause movement of the step plate 16 toward the retracted position whereas retracting of the drive output rod 52 toward a position within the longitudinal drive means 50 will urge movement of the step plate 16 toward the deployed position 6. In this preferred embodiment the drive output rod 52 is pivotally attached with respect to one end of the output arm 54 to facilitate driving pivotal movement thereof relative to the housing pivot bracket 46.

A drive control linkage provides connection of the drive means 50 to the step plate 16. Drive control linkage includes an intermediate link 58 pivotally secured to the output arm 54 preferably at a position oppositely located from the point of connection of pivotal securement thereof with respect to the drive output rod 52 with the output arm aperture 56 and positioned therebetween. Intermediate link 58 is pivotally secured to an intermediate coupling member 60 at the opposite end thereon from the point of pivotal securement with respect to the output arm 54. The intermediate coupling member 60 is pivotally secured with respect to an inner locking to an inner locking lever 82. Inner locking lever 82 defines an inner locking lever central aperture 83 therein which is adapted to receive a linking pin 80 extending therethrough. Inner locking lever 82 includes an inner locking lever abutment surface 84 which can be urged into abutment with the outer surface of the driven arm cross member 24 to limit movement of the stop plate 16 toward the deployed position 6 and facilitate over-center securement of the step plate 16 so positioned. As the step plate 16 is urged to move toward the deployed position 6. the inner locking lever 82 and, in particular, the inner locking lever abutment surface 84, will bear against driven arm cross member 24 to terminate powered movement of the step plate 16 toward the deployed position 6 and facilitate temporary locking therein.

Inner locking lever 82 also defines an inner locking lever outer aperture 85 extending therethrough spatially disposed from said inner locking lever central aperture 83 to facilitate pivotally movement attachment thereof relative to the intermediate coupling member 60.

The locking mechanism of the present invention further includes a housing drive boss assembly 64. The housing drive boss assembly 64 will include a first housing drive control boss member 66 defining a first housing drive control boss hole 68 extending therethrough in a direction extending generally parallel to the lower surface 12 of the main housing plate 10. The housing drive boss assembly 64 also includes a second housing drive control boss member 70 with a second housing drive control boss hole 72 defined therein. Preferably the second housing drive control boss hole 72 will be oriented extending approximately parallel to the lower surface 12 of the main housing plate 10 in direct axial registration with respect to the first housing drive control boss hole 68. A housing drive pin 62 is positionable extending axially through the first housing drive control boss hole 68 and the second housing drive control boss hole 72. This housing drive pin 62 so positioned will provide a means for pivotally moveably mounting of the outer locking lever assembly 74.

The outer locking lever assembly 74 will include a first outer locking lever 76 which defines a first outer locking lever linking pin aperture 104 at an intermediate location therein and a first outer locking lever housing drive pin aperture 106 adjacent one end thereof. In a similar manner a second outer locking lever 78 will be included in the outer locking assembly 74 which defines a second outer locking lever linking pin aperture 108 at an intermediate location therein and a second outer locking lever housing drive pin aperture 110 adjacent one end thereof. With this construction the linking pin 80 can extend through the first outer locking lever linking pin aperture 104 of the first outer locking lever 76 and also through the second outer locking linking pin aperture 108 of the second outer locking lever 78. The linking pin 80 will also extend through the inner locking lever central aperture 83 of inner lock lever 82 with lever 82 positioned between the first outer locking lever 76 and the second outer locking lever 78.

The mounting of the outer locking lever assembly 74 with respect to the main housing plate 10 is achieved by positioning the housing drive pin 62 in a position extending through the first outer locking lever housing drive pin aperture 106 of first outer locking lever 76 and also through the second outer locking lever housing drive pin aperture 110 of the second outer locking lever 78. In this manner both the first outer locking lever 76 and the second outer locking lever 78 will each be pivotally secured with respect to main housing plate 10 and will each be pivotally secured with respect to the linking pin 80 at positions on each opposite side of the inner locking lever 82. Linking pin 80 will extend through the inner locking lever central aperture 83 of the inner locking lever to so position the linking pin 80 between the first outer locking lever 76 and the second outer locking lever 78 with all three lever pivotally moveable secured with respect thereto.

It should be appreciated that there are three main axes for providing the capability of pivotal movement within the locking mechanism of the apparatus of the present invention including the axis of the housing drive pin 62 and the axis of the driven arm cross member 24 and the axis of the linking pin 80 positioned generally therebetween.

Control of movement of the linking pin 80 with respect to the housing drive pin 62 is achieved because each of the first outer locking lever 76 and the second outer locking lever 78 are pivotally secured with respect to both pins 62 and 80. Relative movement between the linking pin 80 and the driven arm cross member 24 is achieved by a driven cross member drive link assembly 98. This driven cross member drive link assembly 98 includes a first driven cross member link 100 and a second driven cross member link 102. Each of these links are pivotally secured with respect to the driven arm cross member 24 and also with respect to the linking pin 80 to achieve coordinated movement therebetween. Preferably the first driven cross member link 100 is positioned between the first outer locking lever 76 and the inner locking lever 82. On the opposite side thereof, preferably, the second driven cross member link 102 is positioned between the inner locking lever 82 and the second outer locking lever 78.

One of the important characteristics of this invention is to appreciate that the inner locking lever abutment surface 84 of inner locking lever 82 and the first outer locking lever abutment surface 77 of first outer locking lever 76 and the second outer lever abutment surface 79 of second outer locking lever 78 will simultaneously be moved into contact with the driven arm cross member 24 which operates as the stop and locking mechanism for holding the main housing plate 10 in the fully deployed position 6.

It is very important further to consider that the movement of the linking pin 80 when the locking mechanism of the apparatus of this invention is brought to the fully deployed position 6 is to a slightly over center position. That over center position is achieved by defining a plane extending between the axis of the housing drive pin 62 and the axis of the driven arm cross member 24 and allowing the longitudinal axis of the locking pin 80 to move completely through and beyond this defined plane immediately prior to the step plate 16 arriving at the fully deployed position 6. The over center positioning of lining pin 80 achieves a firm and secure locking capability not otherwise possible with an apparatus of this limited size and construction.

Another important consideration for the apparatus of the present invention is maintaining the linkage of the driving and locking mechanism at a predefined spacing below the lower surface 12 of the main housing plate 10 because it is confined within such a narrow area. The construction of the apparatus of the present invention operate within limited space restrictions and thus portions of the linkage operate in close tolerances relative to the adjacent lower surface 12 of main housing plate 10 For this purpose a linkage position control assembly 86 is included for carefully and accurately controlling linkage movement and positioning at all times. Linkage position control assembly 86 preferably includes a position control stud 88 which extends through the coupling member 60 and through a position control slot 90 defined in the main housing plate 10 extending completely therethrough from the lower surface 12 to the upper surface 14. A lower position control washer 92 is secured to the position control stud 88 in direct abutment with respect to the lower surface 12 of the main housing plate 10. Similarly but oppositely, an upper position control washer 94 is secured to the position control stud 88 at a location in abutment with the upper surface 14 of the main housing plate 10. In this manner the positioning of the intermediate coupling member 60 and the portions of the linkage directly or indirectly secured thereto will be maintained in a close spatial displacement from the lower surface 12 of the main housing plate 10. This construction achieves the operational strength desired by the apparatus of the present invention while allows operation within a very narrow confined dimension. The position control stud 88 can be a conventional bolt with the head positioned above the upper position control washer 94 above the upper surface 14 and with the lower threaded portion extending through and below the intermediate coupling member 60 with a position control nut 96 secured to the undersurface thereof for achieving effective operation of the linkage position control assembly 86.

One of the unique advantages of the present invention is the use of the over-center mechanism which allows the overall structure and, particularly, the longitudinal drive means 50 and the associated drive output rod 52, to have lower total strength requirements since the over-center construction affords basic structural strength in the inherent design thereof. This enhanced strength is, thusly, provide by the design of the drive means 50 and output rod 52 rather than by making the locking mechanism of more heavy-duty parts. Because of this design, the cost of production and material cost are minimized without sacrificing strength. Strength is an important issue in this device because there are large tensile forces exerted through the structural components because a fireman stepping on the step when deployed is often done in a very quick and sudden manner with heavy loads being carried. As such a strong design is needed and present design achieves this result from the over-center movement capability rather than from merely making the components from more heavy duty parts. The use of the lighter duty drive means 50 and output rod 52 allows the use of a smaller actuator for savings in cost as well as in overall size and weight.

Also space considerations in this design are extremely important because this device usually extends downwardly when in the stored position and downwardly and outwardly when in the deployed position from a location immediately below a passenger entry location such as a truck door. Thus, achieving the desire ground clearance for any similarly positioned auto or truck part is an important consideration. This advantage is particularly important for emergency vehicles such as fire trucks which are required to be capable of moving quickly and easily over moderately sized curbs and in other street and/or ground areas that may not be perfectly level. It is important that no part of the truck substructure contact the substrate on which the vehicle is being driven even when used in such demanding situations. All such vehicles need to be fully capable of moving through various angles of approach and department and navigating fairly steep grades often encountered in driveway entrances or highly crowned roads. All devices positioned beneath such emergency-type vehicles need to be fully capable of serious off-road travel without bottoming out.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An automated retractable step apparatus to facilitate access to a vehicle which comprises:
   A. a main housing bracket attachable to a vehicle to facilitate access thereto, said main housing bracket including a main housing plate which defines an upper surface and a lower surface facing away from one another, said main housing plate defining a position control slot therein;
   B. a driven arm assembly pivotally attached to said main housing plate and movable with respect thereto between a retracted position adjacent said lower surface of said main housing plate and a deployed position extending outwardly therefrom, said driven arm assembly including a driven arm cross member;
   C. a free arm assembly pivotally attached to said main housing plate and movable with respect thereto between a retracted position adjacent said lower surface of said main housing plate and a deployed position extending outwardly therefrom;

D. a step plate pivotally attached to said driven arm assembly to be movable therewith between a retracted position adjacent said lower surface of said main housing plate and a deployed position extending outward therefrom, said step plate also being pivotally attached to said free arm assembly to be movable therewith between a retracted position adjacent said lower surface of said main housing plate and a deployed position extending outward therefrom, said step plate being oriented approximately horizontally responsive to being in the deployed position;

E. a drive means operatively connected to said driven arm assembly for powering movement thereof between said retracted position and said deployed position;

F. drive control linkage operatively attached to said drive means and to said driven arm assembly and moveable between a retracted and extended position to control movement of said driven arm assembly, said free arm assembly and said step plate between the respective retracted and deployed positions thereof; and G. a linkage position control assembly attached with respect to said drive control linkage and moveably attached to said main housing plate for maintaining limited spacing between said lower surface of said main housing plate and said drive control linkage, said linkage position control assembly including a position control stud secured to said drive control linkage and extending through said position control slot to be moveable therewithin to allow operative movement of said drive control linkage while maintaining limited spacing between said lower surface of said main housing plate and said drive control linkage.

2. An automated retractable step apparatus to facilitate access to a vehicle as defined in claim 1 wherein said linkage position control assembly includes:

A. an upper position control washer positioned extending around said position control stud in slideable abutment with respect to said upper surface of said main housing plate; and B. a lower position control washer positioned extending around said position control stud in slideable abutment with respect to said lower surface of said main housing plate, said main housing plate being maintained in a position between said upper position control washer and said lower position control washer which are moveable along with said position control stud along said position control slot to facilitate maintaining of limited spacing between said lower surface of said main housing plate and said drive control linkage.

3. A automated retractable step apparatus to facilitate access to a vehicle as defined in claim 1 wherein said drive means further includes drive output rod operative attached to said drive control linkage, said drive output rod being moveable longitudinally to an extended position to power movement of said drive control linkage and said step plate to the deployed position and being moveable longitudinally to a retracted position to power movement of said drive control linkage and said step plate to the retracted position.

4. An automated retractable step apparatus to facilitate access to a vehicle as defined in claim 3 wherein said drive control linkage includes:

A. an output arm pivotally mounted with respect to said main housing plate and movably secured with respect to said drive output rod;

B. an intermediate link pivotally attached with respect to said output aim at a position thereon spatially disposed from said drive output rod with said output arm being pivotally mounted with respect to said main housing plate at a position thereon located between said intermediate link and said output arm;

C. an intermediate coupling member moveably attached to said intermediate link at a location thereon spatially disposed from said output arm;

D. an outer locking lever assembly pivotally mounted with respect to said main housing plate, said outer locking lever assembly including:

(1) a first outer locking lever pivotally mounted with respect to said main housing plate, said first outer locking lever defining a first outer locking lever abutment surface thereon;

(2) a second outer locking lever pivotally mounted with respect to said main housing plate at a location spatially disposed from said first outer locking lever, said second outer locking lever defining a second outer locking lever abutment surface thereon;

(3) a linking pin extending through said first outer locking lever and said second outer locking lever, said first outer locking lever and said second outer locking lever being pivotally moveably mounted with respect to said linking pin;

(4) an inner locking lever being pivotally mounted with respect to said intermediate coupling member to be moveable therewith and also pivotally moveably mounted with respect to said linking pin, said inner locking lever defining an inner locking lever abutment surface adapted to be moveable into abutting contact with said intermediate coupling member, said inner locking lever abutment surface and said first outer locking lever abutment surface and said second outer locking lever abutment surface each being moveable approximately into abutting engagement with said driven arm cross member responsive to movement of said drive control linkage to the extended position thereof to facilitate locking of said step plate in the deployed position; and (5) a driven cross member drive link assembly pivotally moveably attached to said linking pin and pivotally moveably attached to said driven arm cross member to facilitate powering of movement of said driven arm assembly between the deployed and retracted position thereof.

5. An automated retractable step apparatus to facilitate access to a vehicle as defined in claim 4 wherein said driven cross member drive link assembly includes:

A. a first driven cross member link pivotally moveably attached to said linking pin and pivotally moveably attached to said driven arm cross member; and B. a second driven cross member link pivotally moveably attached to said linking pin at a position spatially disposed from said first driven cross member link and pivotally moveably attached to said driven arm cross member.

6. An automated retractable step apparatus to facilitate access to a vehicle as defined in claim 5 wherein said first driven cross member link is positioned between said first outer locking lever and said inner locking lever and wherein said second driven cross member link is positioned between said second outer locking lever and said inner locking lever.

7. An automated retractable step apparatus to facilitate access to a vehicle as defined in claim 6 wherein said inner locking lever is positioned between said first driven cross member link and said second driven cross member link.

8. An automated retractable step apparatus to facilitate access to a vehicle as defined in claim 4 wherein said drive control linkage includes a housing pivot bracket fixedly secured to said lower surface of said main housing plate and extending outwardly away therefrom and wherein said output arm is pivotally moveably attached to said housing pivot bracket and said main housing bracket at a position located therebetween to facilitate pivotal movement of said output arm with respect to said main housing plate.

9. An automated retractable step apparatus to facilitate access to a vehicle as defined in claim 8 wherein said housing pivot bracket includes a housing bracket pin positioned extending through said output arm and through said main housing plate to facilitate pivotal movement of said output arm with respect to said housing plate.

10. An automated retractable step apparatus to facilitate access to a vehicle as defined in claim 4 wherein the pivotal attachment of said intermediate link with respect to said intermediate coupling member is oriented perpendicularly with respect to the pivotal attachment of said inner locking lever with respect to said intermediate coupling member and spatially disposed with respect thereto.

11. An automated retractable step apparatus to facilitate access to a vehicle as defined in claim 4 wherein said main housing bracket includes a housing drive boss assembly comprising:
A. a first housing drive control boss member mounted upon said lower surface of said main housing plate and extending outwardly therefrom, said first housing drive control boss member defining a first housing drive control boss hole extending therethrough;
B. a second housing drive control boss member mounted upon said lower surface of said main housing plate at a position spatially disposed from said first housing drive control boss member and extending outwardly from said lower surface, said second housing drive control boss member defining a second housing drive control boss hole extending therethrough; and
C. a housing drive pin positioned extending through said first housing drive control boss hole and through said second drive control boss hole, said housing drive pin also extending through said first outer locking lever and through said second outer locking lever to facilitate pivotal movement thereof and attachment thereof with respect to said lower surface of said main housing plate.

12. An automated retractable step apparatus to facilitate access to a vehicle as defined in claim 11 wherein said first outer locking lever and said second outer locking lever are each positioned spatially disposed from one another and between said first housing drive control boss member and said second housing drive control boss member.

13. An automated retractable step apparatus to facilitate access to a vehicle as defined in claim 11 wherein movement of said drive control linkage from the retracted position to the extended position caused movement of said linking pin to an overcenter position beyond a plane defined by said housing drive pin and said driven arm cross member.

14. An automated retractable step apparatus to facilitate access to a vehicle as defined in claim 1 wherein said driven arm assembly includes:
A. a first driven arm member pivotally attached with respect to said main housing plate; and
B. a second driven arm member pivotally attached with respect to said main housing plate at a position spatially disposed from said first driven arm member, said driven arm cross member fixedly secure to said first driven arm member and said second driven arm member to coordinate simultaneous driven movement thereof.

15. An automated retractable step apparatus to facilitate access to a vehicle as defined in claim 1 wherein said free arm assembly includes:
A. a first free arm member pivotally attached with respect to said main housing plate; and
B. a second free arm member pivotally attached with respect to said main housing plate at a position spatially disposed from said first free arm member; and
C. a free arm cross member fixedly secure to said first free arm member and said second free arm member to coordinate simultaneous movement thereof.

16. An automated retractable step apparatus to facilitate access to a vehicle as defined in claim 15 wherein said driven arm assembly is positioned between said first free arm member and said second free arm member of said free arm assembly.

17. An automated retractable step apparatus to facilitate access to a vehicle which comprises:
A. a main housing bracket attachable to a vehicle to facilitate access thereinto, said main housing bracket including a main housing plate which defines an upper surface and a lower surface facing away from one another;
B. a driven arm assembly pivotally attached to said main housing plate and movable with respect thereto between a retracted position adjacent said lower surface of said main housing plate and a deployed position extending outwardly therefrom, said driven arm assembly including a driven arm cross member;
C. a free arm assembly pivotally attached to said main housing plate and movable with respect thereto between a retracted position adjacent said lower surface of said main housing plate and a deployed position extending outwardly therefrom;
D. a step plate pivotally attached to said driven arm assembly to be movable therewith between a retracted position adjacent said lower surface of said main housing plate and a deployed position extending outward therefrom, said step plate also being pivotally attached to said free arm assembly to be movable therewith between a retracted position adjacent said lower surface of said main housing plate and a deployed position extending outward therefrom, said step plate being oriented approximately horizontally responsive to being in the deployed position;
E. a drive means operatively connected to said driven arm assembly for powering movement thereof between said retracted position and said deployed position, said drive means further includes drive output rod which is moveable longitudinally to an extended position to power movement of said step plate to the deployed position and being moveable longitudinally to a retracted position to power movement of said step plate to the retracted position;
F. drive control linkage operatively attached to said drive output rod of said drive means and to said driven arm assembly and moveable between a retracted and extended position to control movement of said driven arm assembly, said free arm assembly and said step plate between the respective retracted and deployed positions thereof, said drive control linkage includes:
(1) an output arm pivotally mounted with respect to said main housing plate and movably secured with respect to said drive output rod;

(2) an intermediate link pivotally attached with respect to said output arm at a position thereon spatially disposed from said drive output rod with said output arm being pivotally mounted with respect to said main housing plate at a position thereon located between said intermediate link and said output arm;

(3) an intermediate coupling member moveably attached to said intermediate link at a location thereon spatially disposed from said output arm;

(4) an outer locking lever assembly pivotally mounted with respect to said main housing plate, said outer locking lever assembly including:

(a) a first outer locking lever pivotally mounted with respect to said main housing plate, said first outer locking lever defining a first outer locking lever abutment surface thereon;

(b) a second outer locking lever pivotally mounted with respect to said main housing plate at a location spatially disposed from said first outer locking lever, said second outer locking lever defining a second outer locking lever abutment surface thereon;

(c) a linking pin extending through said first outer locking lever and said second outer locking lever, said first outer locking lever and said second outer locking lever being pivotally moveably mounted with respect to said linking pin;

(d) an inner locking lever being pivotally mounted with respect to said intermediate coupling member to be moveable therewith and also pivotally moveably mounted with respect to said linking pin, said inner locking lever defining an inner locking lever abutment surface adapted to be moveable into abutting contact with said intermediate coupling member, said inner locking lever abutment surface and said first outer locking lever abutment surface and said second outer locking lever abutment surface each being moveable approximately into abutting engagement with said driven arm cross member responsive to movement of said drive control linkage to the extended position thereof to facilitate locking of said step plate in the deployed position;

(e) a driven cross member drive link assembly pivotally moveably attached to said linking pin and pivotally moveably attached to said driven arm cross member to facilitate powering of movement of said driven arm assembly between the deployed and retracted position thereof; and G. a linkage position control assembly attached with respect to said drive control linkage and moveably attached to said main housing plate for maintaining limited spacing between said lower surface of said main housing plate and said drive control linkage.

18. An automated retractable step apparatus to facilitate access to a vehicle which comprises:

A. a main housing bracket attachable to a vehicle to facilitate access thereinto, said main housing bracket including a main housing plate which defines an upper surface and a lower surface facing away from one another, said main housing plate defining a position control slot therein;

B. a driven arm assembly pivotally attached to said main housing plate and movable with respect thereto between a retracted position adjacent said lower surface of said main housing plate and a deployed position extending outwardly therefrom, said driven arm assembly including a driven arm cross member;

C. a free arm assembly pivotally attached to said main housing plate and movable with respect thereto between a retracted position adjacent said lower surface of said main housing plate and a deployed position extending outwardly therefrom;

D. a step plate pivotally attached to said driven arm assembly to be movable therewith between a retracted position adjacent said lower surface of said main housing plate and a deployed position extending outward therefrom, said step plate also being pivotally attached to said free arm assembly to be movable therewith between a retracted position adjacent said lower surface of said main housing plate and a deployed position extending outward therefrom, said step plate being oriented approximately horizontally responsive to being in the deployed position;

E. a drive means operatively connected to said driven arm assembly for powering movement thereof between said retracted position and said deployed position, said drive means further includes drive output rod which is moveable longitudinally to an extended position to power movement of said step plate to the deployed position and being moveable longitudinally to a retracted position to power movement of said step plate to the retracted position;

F. drive control linkage operatively attached to said drive output rod of said drive means and to said driven arm assembly and moveable between a retracted and extended position to control movement of said driven arm assembly, said free arm assembly and said step plate between the respective retracted and deployed positions thereof, said drive control linkage includes:

(1) an output arm pivotally mounted with respect to said main housing plate and movably secured with respect to said drive output rod;

(2) an intermediate link pivotally attached with respect to said output arm at a position thereon spatially disposed from said drive output rod with said output arm being pivotally mounted with respect to said main housing plate at a position thereon located between said intermediate link and said output arm;

(3) an intermediate coupling member moveably attached to said intermediate link at a location thereon spatially disposed from said output arm;

(4) an outer locking lever assembly pivotally mounted with respect to said main housing plate, said outer locking lever assembly including:

(a) a first outer locking lever pivotally mounted with respect to said main housing plate, said first outer locking lever defining a first outer locking lever abutment surface thereon;

(b) a second outer locking lever pivotally mounted with respect to said main housing plate at a location spatially disposed from said first outer locking lever, said second outer locking lever defining a second outer locking lever abutment surface thereon;

(c) a linking pin extending through said first outer locking lever and said second outer locking lever, said first outer locking lever and said second outer locking lever being pivotally moveably mounted with respect to said linking pin;

(d) an inner locking lever being pivotally mounted with respect to said intermediate coupling member to be moveable therewith and also pivotally moveably mounted with respect to said linking pin, said inner locking lever defining an inner locking lever abutment surface adapted to be moveable into abutting contact with said intermediate coupling member, said inner locking lever abutment surface and said first outer locking lever abutment surface and said second outer locking lever abutment surface each being moveable approximately into abutting engagement with said driven arm cross member responsive to movement of said drive control linkage to the extended position thereof to facilitate locking of said step plate in the deployed position;
(e) a driven cross member drive link assembly pivotally moveably attached to said linking pin and pivotally moveably attached to said driven arm cross member to facilitate powering of movement of said driven arm assembly between the deployed and retracted position thereof, said driven cross member drive link assembly including:
(f) a first driven cross member link pivotally moveably attached to said linking pin and pivotally moveably attached to said driven arm cross member;
(g) a second driven cross member link pivotally moveably attached to said linking pin at a position spatially disposed from. said first driven cross member link and pivotally moveably attached to said driven arm cross member; and G. a linkage position control assembly attached with respect to said drive control linkage and moveably attached to said main housing plate for maintaining limited spacing between said lower surface of said main housing plate and said drive control linkage, said linkage position control assembly including:
(1) a position control stud secured to said drive control linkage and extending through said position control slot to be moveable therewithin to allow operative movement of said drive control linkage while maintaining limited spacing between said lower surface of said main housing plate and said drive control linkage;
(2) an upper position control washer positioned extending around said position control stud in slideable abutment with respect to said upper surface of said main housing plate; and
(3) a lower position control washer positioned extending around said position control stud in slideable abutment with respect to said lower surface of said main housing plate, said main housing plate being maintained in a position between said upper position control washer and said lower position control washer which are moveable along with said position control stud along said position control slot to facilitate maintaining of limited spacing between said lower surface of said main housing plate and said drive control linkage.

* * * * *